United States Patent [19]

Fujie et al.

[11] Patent Number: 4,913,059
[45] Date of Patent: Apr. 3, 1990

[54] LEVITATION, PROPULSION AND GUIDANCE MECHANISM FOR INDUCTIVE REPULSION-TYPE MAGNETICALLY LEVITATED RAILWAY

[75] Inventors: Junji Fujie, Hino; Hiroshi Nakashima, Hachioji; Shunsuke Fujiwara, Tokyo, all of Japan

[73] Assignee: Railway Technical Research Institute, Tokyo, Japan

[21] Appl. No.: 309,637

[22] Filed: Feb. 13, 1989

[30] Foreign Application Priority Data

Feb. 25, 1988 [JP] Japan .................................. 63-40726
May 27, 1988 [JP] Japan ................................. 63-128161

[51] Int. Cl.$^4$ .......................................... B60L 13/10
[52] U.S. Cl. .................................... 104/282; 104/286; 104/294
[58] Field of Search ............... 104/281, 282, 284, 286, 104/292, 294, 288, 290, 291, 293; 505/902, 903, 904, 905, 906, 907, 908; 318/135

[56] References Cited

U.S. PATENT DOCUMENTS

| | | |
|---|---|---|
| 3,470,828 | 10/1969 | Powell et al. |
| 3,768,417 | 10/1973 | Thornton .............................. 505/903 |
| 3,841,227 | 10/1974 | Fink ..................................... 104/286 |
| 3,896,737 | 7/1975 | Miericke .............................. 505/906 |
| 3,913,493 | 10/1975 | Maki ..................................... 104/292 |
| 4,273,054 | 6/1981 | Yamashita ........................... 505/907 |
| 4,276,832 | 7/1981 | Sika ...................................... 104/292 |
| 4,299,173 | 11/1981 | Arima .................................. 104/284 |
| 4,779,538 | 10/1988 | Fujiwara .............................. 104/282 |

Primary Examiner—Andres Kashnikow
Assistant Examiner—M. Cunningham
Attorney, Agent, or Firm—Armstrong, Nikaido, Marmelstein, Kubovcik & Murray

[57] ABSTRACT

A levitation, propulsion and guidance mechanism for an inductive repulsion-type magnetically levitated railway in which a vehicle runs along a track bed has superconducting coils fixedly arranged vertically on both sides of the truck of the vehicle at predetermined intervals therealong in a direction of travel of the vehicle. Propulsion coils are arranged on opposed walls of the track bed at predetermined intervals therealong in the direction of travel of said vehicle, and a propulsion power supply is connected to the propulsion conductor coils. Levitation-guidance conductor coils, each comprising upper and lower conductor coils positioned to have vertical symmetry, are disposed on sides of the propulsion conductor coils facing the superconducting coils and are arranged at predetermined intervals along the direction of travel of the vehicle. The upper and lower coils of each of these levitation-guidance conductor coils are null-flux connected, and opposing ones of the these levitation-guidance conductor coils arranged on the opposed side walls of the track bed are null-flux connected. The upper and lower conductor coils of the levitation-guidance conductor coils are set in such a manner that mutual inductance between the superconducting coils on one side of the vehicle and the opposing levitation-guidance conductor coils on one side wall of the track bed and the mutual inductance between the superconducting coils on the other side of the vehicle and the opposing levitation-guidance conductor coils on the other side wall of the track bed cancel each other out when the vehicle is running on auxiliary wheels.

5 Claims, 11 Drawing Sheets

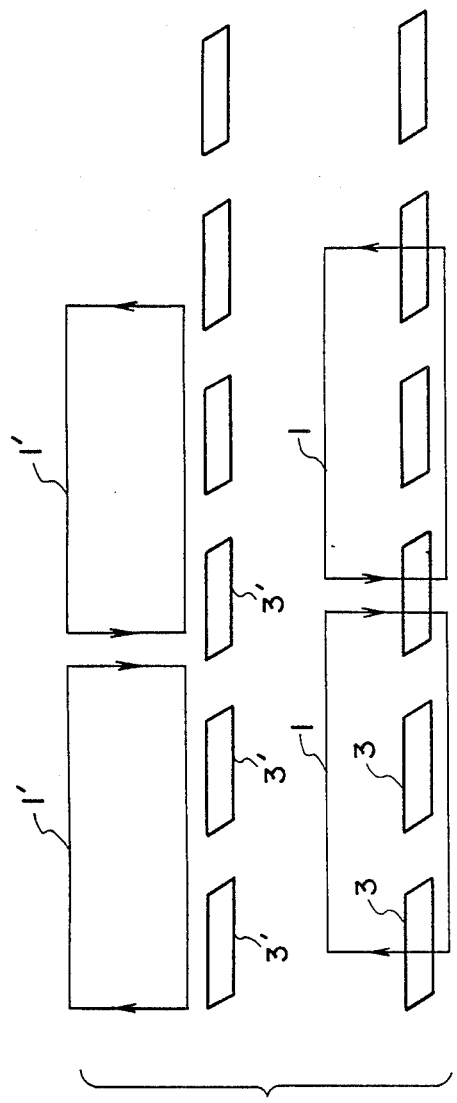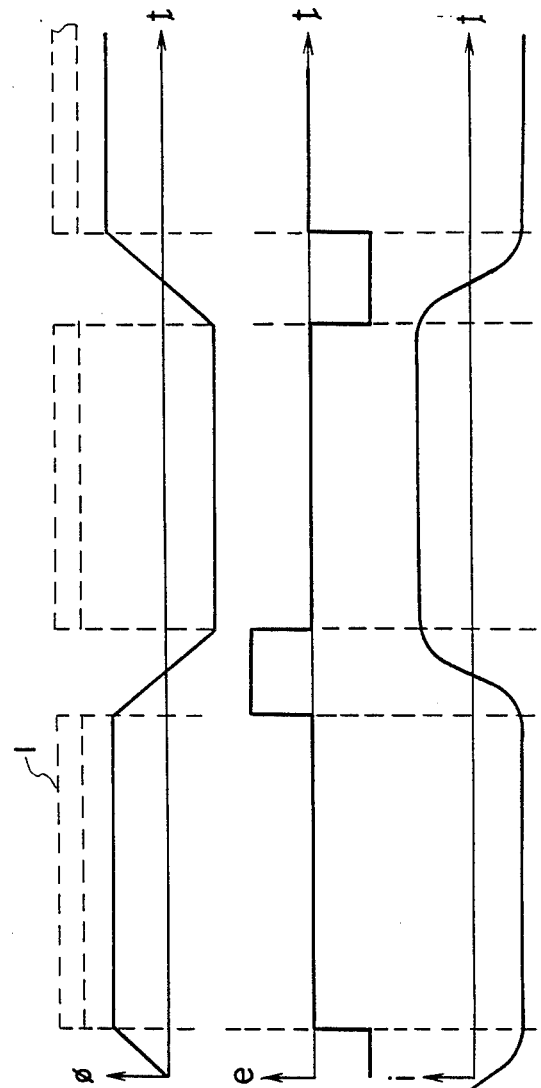
FIG.2(a) (PRIOR ART)
FIG.2(b) (PRIOR ART)
FIG.2(c) (PRIOR ART)
FIG.2(d) (PRIOR ART)

LEVITATION, PROPULSION AND GUIDANCE MECHANISM FOR INDUCTIVE REPULSION-TYPE MAGNETICALLY LEVITATED RAILWAY

BACKGROUND OF THE INVENTION

Inductive repulsion-type magnetically levitated railways in general are well known in the art. An example of such a railway, particularly the levitation, propulsion and guidance mechanism thereof, will now be described with reference to FIGS. 1 through 4.

Superconducting coils 1, 1' are vertically mounted on both sides of a truck 4 of a vehicle VH. Conductor coils 2, 2' which make use of both propulsive and guiding forces for both guidance and propulsion of the vehicle are arranged vertically and continuously at predetermined intervals in the direction of travel of the vehicle along both inner side walls of a track bed 9 having a U-shaped cross section. These coils 2, 2' are so disposed as to be capable of electromagnetically coupling with the superconducting coils 1, 1' mounted on the truck 4. Loop-shaped conductor coils 3, 3' for levitation of the vehicle are arranged horizontally on the bottom surface of the track bed 9 and extend continuously in the direction of travel of the vehicle. The arrangement of the coils is as illustrated in FIG. 2. A levitating force is applied to the vehicle VH by the levitating conductor coils 3, 3' and superconducting coils 1, 1', and the vehicle VH is propelled and guided by the superconducting coils 1, 1' and the conductor coils 2, 2' for propulsion and guidance.

This will be described in greater detail in accordance with FIGS. 2(a) through 4.

As shown in FIG. 2(a), the superconducting coils 1, 1' are arranged vertically at predetermined intervals on both sides of the truck 4 in the direction of travel of the vehicle. The coil-shaped levitating conductor coils 3, 3' are arranged horizontally on the bottom of the track bed 9 and extend continuously with predetermined gaps between them in the direction of travel of the vehicle at positions that allow electromagnetic induction to take place between these coils and the superconducting coils 1, 1'. As long as the vehicle VH is at rest, the magnetic flux produced by the superconducting coils, 1, 1' is not cut by the levitating conductor coils 3, 3'. Accordingly, no current is produced in the levitating conductor coils 3, 3' and, hence, there is no electromagnetic interaction whatsoever between the superconducting coils 1, 1' and levitating conductor coils 3, 3'. The vehicle VH is driven into motion by a linear motor, which is constructed by the superconducting coils 1, 1' mounted on the truck 4 and the conductor coils 2, 2' for propulsion and guidance arranged along the track bed 9. When the vehicle VH runs in this fashion, the superconducting coils 1, 1' travel along the levitating conductor coils 3, 3' disposed at predetermined intervals along the track bed 9 in the direction of vehicle movement, as a result of which a magnetic flux produced by the superconducting coils 1, 1' is cut by the levitating conductor coils 3, 3' so that a current is induced in the latter coils. As shown in FIG. 3, the induced current grows with an increase in the traveling speed of the vehicle VH and saturation occurs at a certain traveling speed of, say, about 200 Km/h. The induced current is held at this level as long as the vehicle runs at this speed or faster. More specifically, the levitating inductor coils 3, 3' shown in FIG. 2(a) develop a linkage flux $\phi$ of the kind illustrated in FIG. 2(b) drawn to positionally correspond to the coils 3, 3', and a levitating voltage e shown in FIG. 2(c) also drawn to positionally correspond to the coils 3, 3' is induced in these coils so that a current i of the kind shown in FIG. 2(d) flows through them. When the flow of a current ia through the superconducting coils 1, 1' has the direction indicated in FIG. 2(e), the current induced in the levitating conductor coils 3, 3' by the current ia flows in the direction indicated in FIG. 2(e). In consequence, according to Fleming's left-hand law, a levitating force $F = B \times ia$ is obtained in the superconducting coils 1, 1', where B represents the density of the magnetic flux generated by the levitating conductor coils 3, 3' and ia is the current flowing through the superconducting coils 1, 1' Thus, the vehicle VH is levitated by a repulsive force acting between the currents induced in the superconducting coils 1,1' provided on the truck 4 and in the levitating conductor coils 3, 3' provided on the track bed 9.

The propulsion and guidance of the vehicle VH will now be described.

The cross-sectional areas of the conductor coils 2, 2' for propulsion and guidance are designed to be equal, and the spacing between the superconducting coil 1 and conductor coil 2 and between the superconducting coil 1' and conductor coil 2' are designed to be equal. The conductor coils 2, 2' for propulsion and guidance null-flux connected, as shown in FIG. 4.

As illustrated in FIG. 4, a polyphase propulsion power supply 8 of three or more phases is connected to the conductor coils 2, 2' for propulsion and guidance, as a result of which currents having the same direction, as indicated by the solid arrows in FIG. 4, flow through the conductor coils 2, 2'. Consequently, according to Fleming's left-hand law, an electromagnetic force which drives the superconducting coils 1, 1' in the forward direction is generated between the vertical segments of the conductor coils 2, 2' and the vertical segments of the superconducting coils 1, 1', so that a propulsion force is produced that propels the vehicle VH provided with the superconducting coils 1, 1'.

Assume that the linkage magnetic fluxes developed in the propulsion and guidance conductor coils 2, 2' respectively opposing the superconducting coils 1, 1' are $\phi g$, $\phi g'$ while the vehicle shown in FIG. 1 is running. In such case the relation $\phi g = \phi g'$ will hold if the vehicle VH is not displaced in the lateral direction. Accordingly, the linkage magnetic flux developed for a pair of coils will be $\phi g - \phi g' = 0$, no current will be induced and, hence, no guiding force will be produced.

On the other hand, if the vehicle VH (FIG. 1) is displaced laterally, the relation $\phi g > \phi g'$ (leftward displacement of the vehicle) or $\phi g < \phi g'$ (rightward displacement of the vehicle) will hold and the linkage flux developed by the pair of coils will be $\phi g - \phi g' = \pm \Delta \phi g'$. As a result, a guiding force proportional to the displacement is produced in a direction which nullifies the displacement. More specifically, as illustrated in FIG. 4, a current having the direction indicated by the dashed arrow flows through the conductor coil 2 for propulsion and guidance owing to the leftward displacement of the superconducting coil 1, as a result of which a repulsive force acts to guide the displaced vehicle to its original state according to Fleming's left-hand law. On the other hand, the superconducting coil 1' is also displaced leftwardly but this displacement causes a current whose direction is indicated by the dashed arrow to flow through the conductor coil 2' for propulsion and guidance. Consequently, the superconducting coil 1' is attracted to the conductor coil 2' according to Fleming's left-hand law.

In this system, powering, coasting, braking and stopping of the vehicle VH are effected by controlling the current that flows into the conductor coils 2, 2' for propulsion and guidance from the propulsion power supply 8.

When the vehicle VH begins to be moved by the propulsion force generated by the conductor coils 2, 2' for propulsion and guidance, levitating force is generated by the superconducting coils 1, 1' and levitating conductor coils 3, 3', and a guiding force is generated by the superconductng coils 1, 1' and conductor coils 2, 2' for propulsion and guidance. After the vehicle VH attains a certain speed, auxiliary wheels 7, 7' (see FIG. 1) are raised and the vehicle is levitated and guided while a constant levitating force is maintained. When the traveling speed of the vehicle VH falls below a certain level, the levitating force diminishes and the auxiliary wheels 7, 7' are lowered to set the vehicle down upon the track bed 9. As shown in FIG. 1, mechanical guidance wheels 5, 5' are rotatably mounted on the ends of respective shafts 6, 6' whose other ends are fixedly secured to the vehicle VH. These wheels 5, 5' are deployed and guide the vehicle VH mechanically while rolling along the side walls of the track bed 9 when the vehicle VH is running on its wheels 7, 7'.

In this magnetic levitating-type railway in which the levitating conductor coils 3, 3' are arranged horizontally on the bottom of the track bed 9 and the superconducting coils 1, 1' are mounted vertically on both sides of the truck 4 opposing the two inner side walls of the track bed 9, it is necessary to pass a large induced current through the levitating conductor coils 3, 3', and there is a limit upon the extent to which power loss ascribable to the levitating conductor coils 3, 3' can be reduced. That is, there is a limit upon how much the traveling resistance of the vehicle VH can be reduced. In addition, since an unstable spring force in the lateral direction is generated by the levitating conductor coils 3, 3', it is required that a stabilizing spring force exceeding the unstable spring force be produced by the conductor coils 2, 2' for propulsion and guidance.

In this connection, an arrangement of the kind shown in FIG. 5 has been proposed for the purpose of reducing electromagnetic traveling resistance in a magnetically levitated railway.

In FIG. 5, elements identical with those shown in FIGS. 1 through 4 are designated by like reference characters. In this proposed arrangement, superconducting coils 10, 10' are attached horizontally to both sides of the truck 4 of vehicle VH and are arranged to be symmetrical about the center of the truck 4. Conductor coils 12, 13 and 12', 13', of identical shape and dimensions, are likewise horizontally attached to surfaces of the track bed 9 that are above and below the superconducting coils 10, 10'. The conductor coils 12, 13 are null-flux connected, as are the conductor coils 12', 13'. Thus, the coils 12, 13 and 12', 13' respectively construct conductor coils 11, 11'. These conductor coils 11, 11' are arranged at predetermined intervals continuously along the length of the track bed 9.

In this arrangement, the levitating force is produced by the conductor coils 12, 13 and 12', 13'. If the superconducting coils 10, 10' on the truck 4 are located at positions intermediate the upper and lower conductor coils 12, 13 and 12', 13', respectively, the linkage magnetic flux of the superconducting coils 10, 10' will be zero and the electromagnetic traveling resistance will be zero. When the superconducting coils 10, 10' are displaced upward or downward, a force acts that restores the superconducting coils 10, 10' to their positions midway between the coils 12, 13 and 12', 13'. If the superconducting coils 10, 10' are displaced leftward or rightward, however, an unstable force acts in a direction that increases this displacement. Another problem is that the truck 4 and track bed 9 become more complicated in construction.

SUMMARY OF THE INVENTION

An object of the present invention is to provide a magnetically levitated railway in which the magnetic traveling resistance of the vehicle can be minimized to greatly reduce the amount of energy needed for travel in comparison with the prior art, and in which a structure is adopted wherein conductor coils need not be provided on the track bed surface underlying the vehicle, thereby greatly simplifying the structure of the vehicle and track bed over the prior-art structure without the design restrictions that are imposed when the conductor coils are provided on the track bed surface below the vehicle.

Another object of the invention is to provide a magnetically levitated railway in which a propulsion power supply is connected to the connecting wiring which null-flux connects opposing conductor coils for levitation and guidance, whereby one conductor coil is made to perform the functions of propulsion, levitation and guidance, as a result of which it is possible to effect an even greater reduction in electromagnetic traveling resistance through the simplest ground coil mechanism.

According to the present invention, the foregoing objects are attained by providing a magnetically levitated railway in which superconducting coils are arranged vertically on both sides of a truck of a vehicle. Further, conductor coils for propulsion that are capable of opposing the superconducting coils are arranged at predetermined intervals continuously along both side walls of a track bed, and a propulsion power supply is connected to these conductor coils. Levitation and guidance conductor coils, each of which is constructed by null-flux connecting upper and lower conductor coils, are arranged on sides of the conductor coils for propulsion facing the superconducting coils at predetermined intervals along the direction in which the vehicle travels, one of these levitation and guidance conductor coils being null-flux connected to the other levitation and guidance conductor coil which opposes it.

In addition, an arrangement can be adopted in which the conductor coils for propulsion are not separately provided. In such case, the propulsion power supply is connected to connecting wiring which null-flux connects the opposing levitation and guidance conductor coils on both side walls of the track bed, so that one pair of conductor coils concurrently serves the purposes of levitation, propulsion and guidance.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2(a) is a diagrammatic view illustrating the relationship between superconducting coils on a vehicle and levitating conductor coils on a track bed in the magnetically levitated railway of FIG. 1;

FIG. 2(b) is a time chart illustrating magnetic flux interlinking the levitating conductor coils on the track bed in FIG. 2(a);

FIG. 2(c) is a time chart illustrating the voltage generated by the magnetic flux shown in FIG. 2(b);

FIG. 2(d) is a time chart illustrating the current produced by the voltage shown in FIG. 2(c);

DESCRIPTION OF THE PREFERRED EMBODIMENTS

Figure 1:
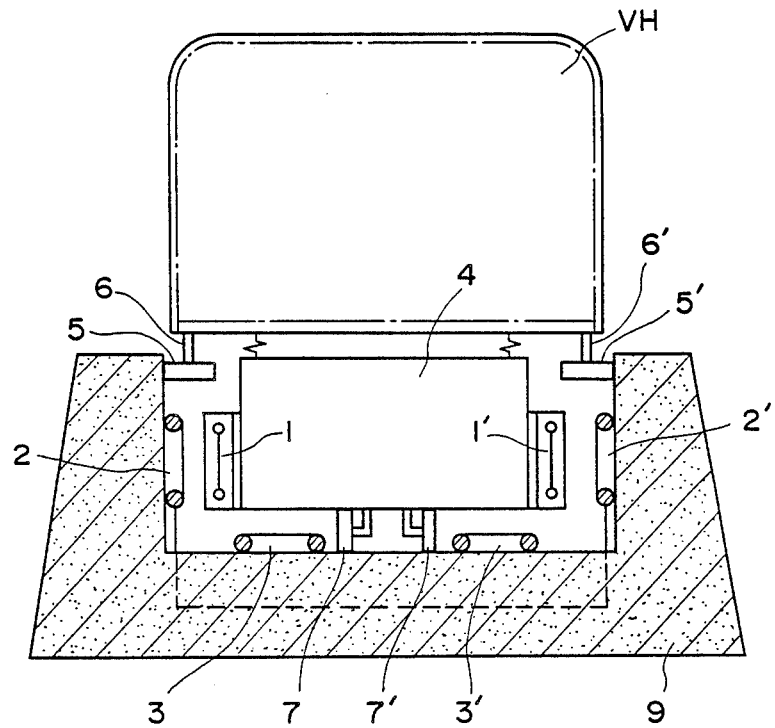
FIG. 1 is a partial sectional view illustrating an example of an inductive repulsion-type magnetically levitated railway according to the prior art.
Figure 2E:
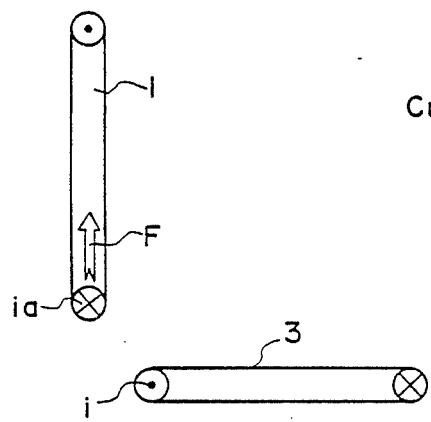
FIG. 2(e) is a sectional view showing a superconducting coil and a levitating conductor coil and is useful in describing the induction of current in the levitating conductor coils by means of the superconducting coils on the vehicle of FIG. 1, as well as the magnetic levitation of the superconducting coils.
Figure 3:
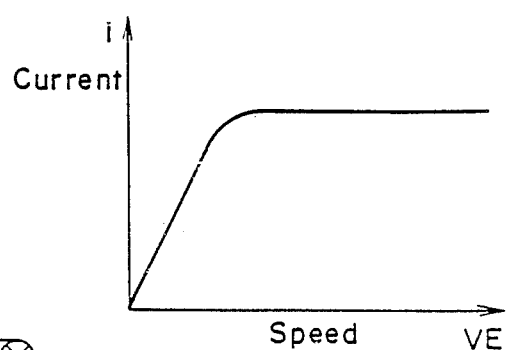
FIG. 3 is a diagram showing the relationship between traveling speed and induced current in the vehicle of a magnetically levitated railway according to the prior art.
Figure 4:
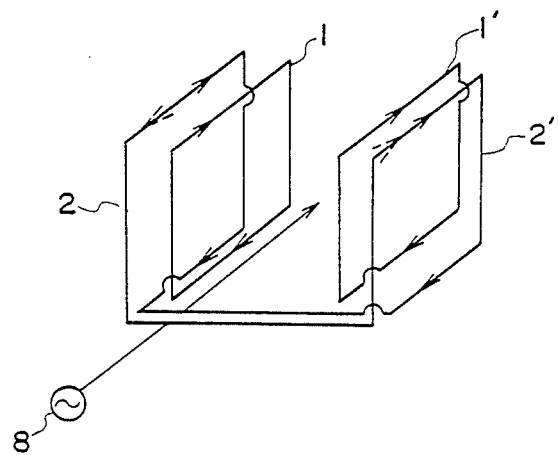
FIG. 4 is a circuit diagram illustrating the electrical connections of superconducting coils on the vehicle in FIG. 1 and guidance and propulsion conductor coils on the track bed.
Figure 5:
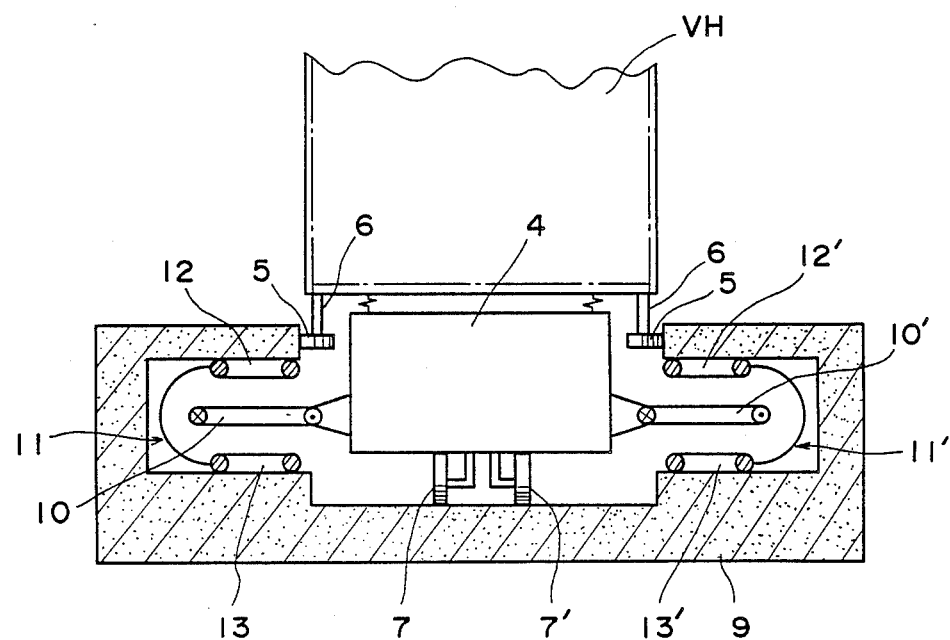
FIG. 5 is a partial sectional view showing another example of a prior-art magnetically levitated railway proposed in order to reduce electromagnetic traveling resistance.

The present invention will now be described with reference to FIGS. 6 through 12, in which elements identical with those shown in FIG. 1 through 5 are designated by like reference characters.

Figure 7:
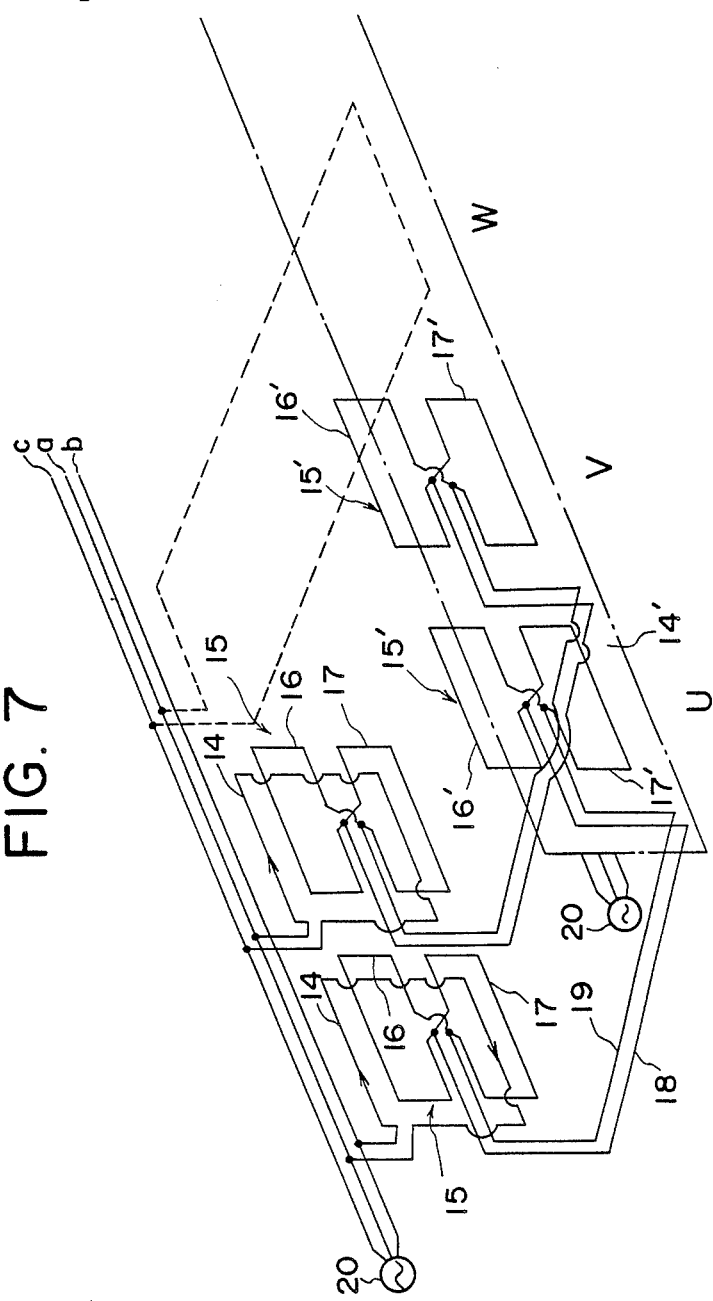
FIG. 7 is a circuit diagram showing the circuit arrangement of conductor coils for propulsion and conductor coils for levitation and guidance in FIG. 6.

Conductor coils 14, 14' for propulsion are arranged in opposed relation on both inner side walls of a U-shaped track bed 9 at predetermined intervals along the direction in which the vehicle travels. As shown in FIG. 7, a three-phase propulsion power supply 20 (a polyphase motor of more than three phases can be employed if desired) is connected to the conductor coils 14, 14' for propulsion. Though the propulsion conductor coil 14' disposed on the nearer side wall of the track bed is deleted from FIG. 7, the propulsion conductor coil 14' is disposed on the nearer side wall of the track bed in the same manner as the propulsion conductor coil 14, and the propulsion power supply 20 is connected to it in the same fashion. Conductor coils 15, 15' for levitation and guidance are disposed in opposed relation on the sides of the propulsion conductor coils 14, 14' facing the superconducting coils 1, 1' and are arranged at predetermined intervals continuously along the direction in which the vehicle travels. Each conductor coil 15 comprises a null-flux connected upper coil 16 and lower coil 17 of the same shape and dimensions, and each conductor coil 15' comprises a null-flux connected upper coil 16' and lower coil 17' of the same shape and dimensions. These opposing conductor coils 15, 15' for levitation and guidance in turn are null-flux connected via connecting wires 18, 19.

The design is such that when the vehicle VH has its auxiliary wheels 7, 7' in contact with the track bed, the vertical midpoints of the superconducting coils 1, 1', the vertical midpoints of the levitation and guidance conductor coils 15, 15' and the vertical midpoints of the propulsion conductor coils 14, 14' lie on the same horizontal line. The upper coils 16, 16' and lower coils 17, 17' of the levitation and guidance conductor coils 15, 15' are vertically symmetrically positioned about respective predetermined points on the horizontal line.

The arrangement described above is such that in response to introduction of power from the propulsion power supply 20, currents having the same direction as shown in FIG. 7 flow into the propulsion conductor coil 14 so that a propulsion force is produced by each of the vertical segments.

When the vehicle VH is running with its auxiliary wheels 7, 7' in contact with the track bed, the linkage flux developed by the conductor coils 15, 15' for levitation and guidance is zero, the current is zero and the electromagnetic resistance is zero. The reason for this is that the positional relationship between the superconducting coils 1, 1' and conductor coils 15, 15' for levitation and guidance is designed as set forth above, while the upper coil 16 and lower coil 17 are null-flux connected, as well as the upper coil 16' and lower coil 17'.

Figure 8:
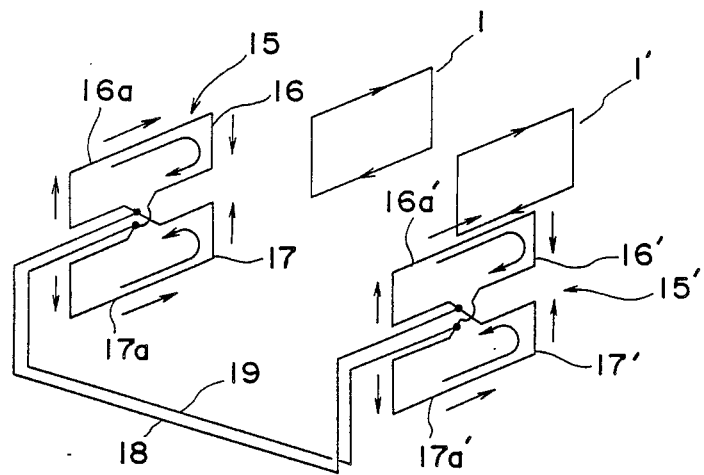
FIG. 8 is a circuit diagram for describing the levitating action of the conductor coils for levitation and guidance shown in FIG. 6.

When the vehicle VH is running while levitated with its wheels 7, 7' raised, the vertical midpoints of the superconducting coils 1, 1' drop below the vertical midpoints of the conductor coils 15, 15' for levitation and guidance, as a result of which a difference is produced in the linkage magnetic flux between upper coil 16 and lower coil 17 and between upper coil 16' and lower coil 17' At such time, currents as shown in FIG. 8 are induced in the upper coil 16 and lower coil 17 and in the upper coil 16' and lower coil 17'. In consequence, an attractive force acts between horizontal segments 16a, 16'a of the two upper coils 16, 16' and the upper horizontal segments of the superconducting coils 1, 1', while a repulsive force acts between horizontal segments 17a, 17'a of the two lower coils 17, 17' and the lower horizontal segments of the superconducting coils 1, 1'. Owing to these repulsive and attractive forces, a levitating force is produced that attempts to return the superconducting coils 1, 1' in the upward direction, with the coils 1, 1' attaining stability at a position where the weight of the vehicle VH is counterbalanced. Since the upper coil 16 and lower coil 17 as well as the upper coil 16' and lower coil 17' generate the levitating force effectively with little current, there is little electromagnetic traveling resistance.

The superconducting coils 1, 1' are arranged symmetrically with respect to the longitudinal center line of the track bed 9, and the opposing upper coils 16, 16' and opposing lower coils 17, 17' are null-flux connected via the connecting wires 18, 19. Therefore, when the vehicle VH is situated in the middle of the track bed, the linkage flux does not become zero even though there is no lateral displacement of the vehicle VH in the levitated state. However, since the linkage fluxes of the conductor coils 15, 15' for levitation and guidance are equal, currents do not flow through the connecting wires 18, 19. As a result, no lateral force is produced.

Figure 6:
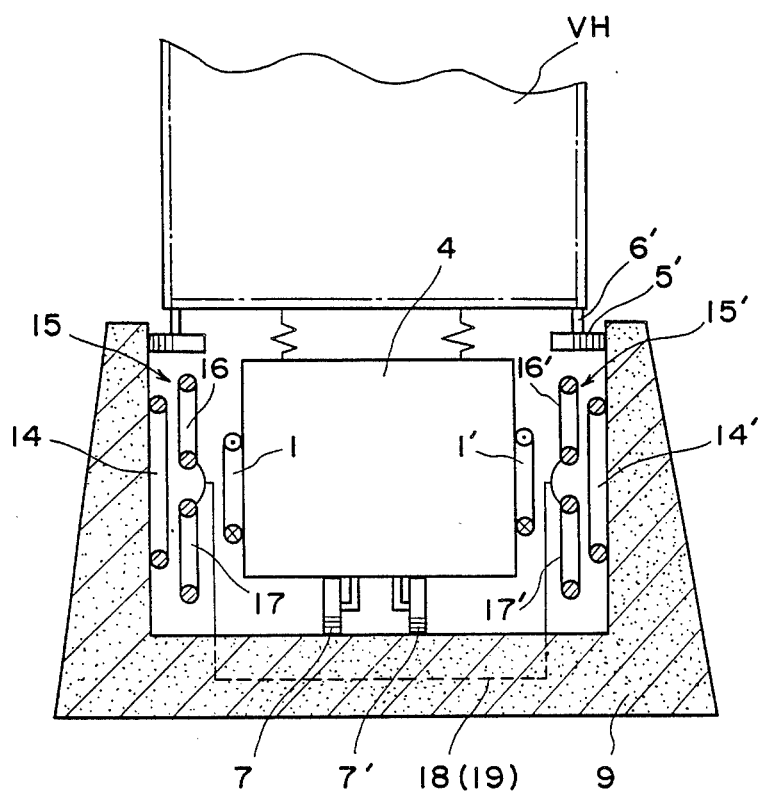
FIG. 6 is a sectional view showing a first embodiment of an inductive repulsion-type magnetically levitated railway according to the present invention.
Figure 9:
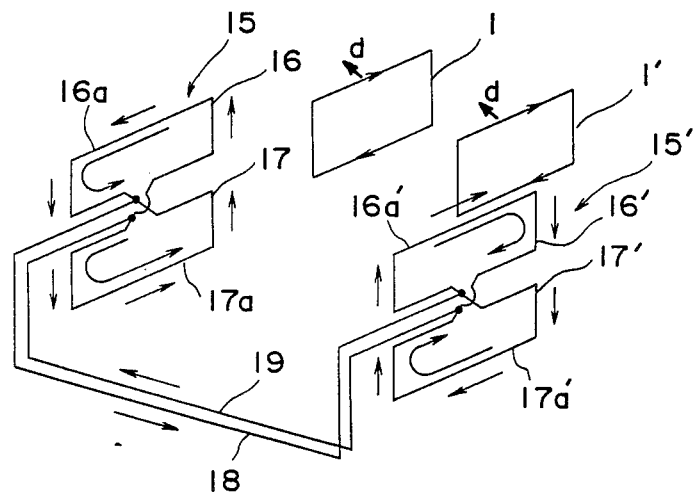
FIG. 9 is a circuit diagram for describing the guiding action of the conductor coils for levitation and guidance shown in FIG. 6.

If the vehicle VH shown in FIG. 6 is displaced leftward, for example, during levitated travel, a difference develops in the linkage flux between the upper coils 16, 16' and between the lower coils 17, 17'. When the superconducting coils 1, 1' cope with this change in linkage flux, currents as shown in FIG. 9 are induced in the levitation and guidance conductor coils 15, 15', whereby a guidance force is produced that the restores the superconducting coils 1, 1' to the middle of the track. In other words, repulsive forces act between the horizontal segment 16a of upper coil 16 and the upper horizontal segment of superconducting coil 1, and between the horizontal segment 17a of lower coil 17 and the lower horizontal segment of superconducting coil 1, while attractive forces act between the horizontal segment 16a' of upper coil 16' and the upper horizontal segment of superconducting coil 1', and between the horizontal segment 17'a of lower coil 17' and the lower horizontal segment of superconducting coil 1'. These forces restore the superconducting coils 1, 1' to the middle of the track.

Figure 10:
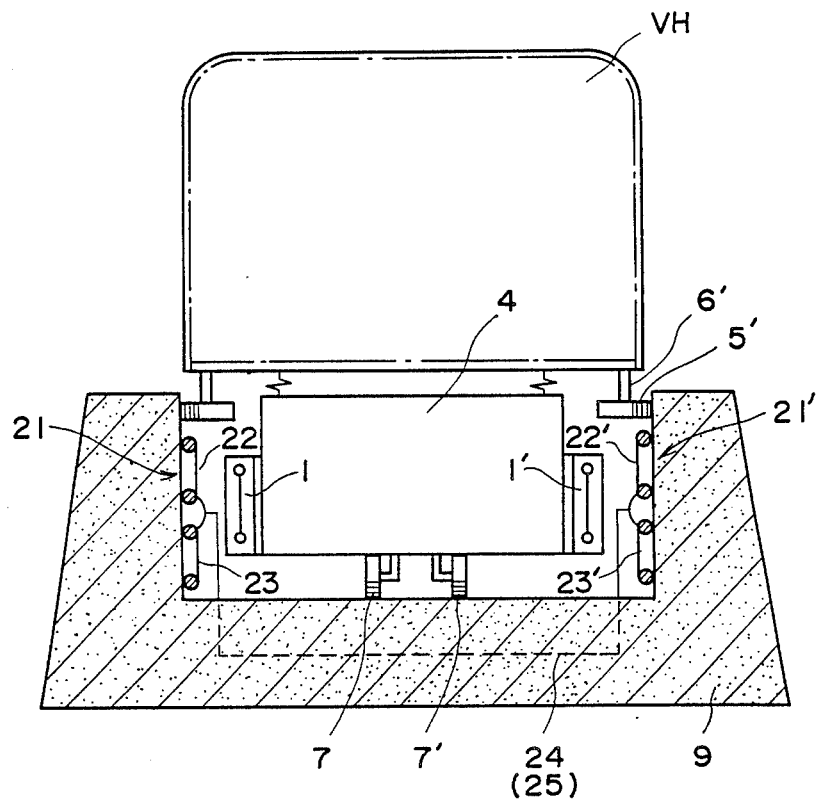
FIG. 10 is a sectional view showing a second embodiment of an inductive repulsion-type magnetically levitated railway according to the present invention.
Figure 11A:
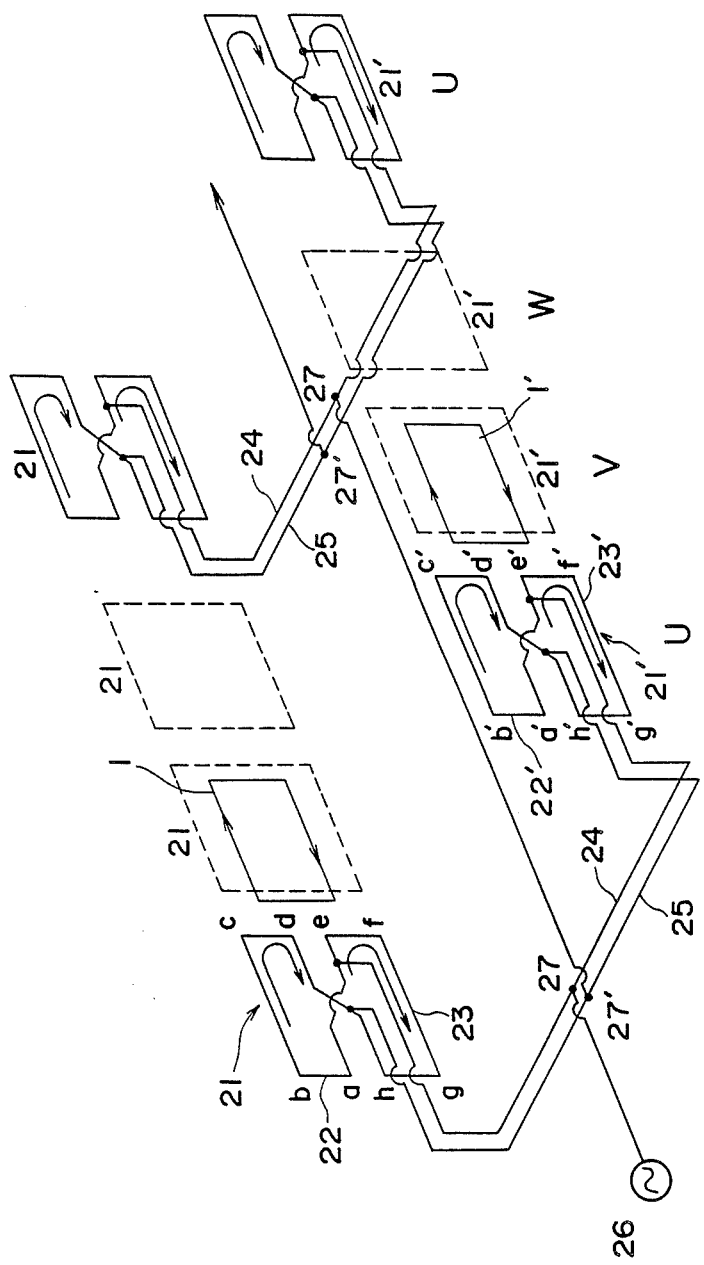
FIG. 11(a) is a circuit diagram showing the circuit arrangement of the conductor coils depicted in FIG. 10.
Figure 11:
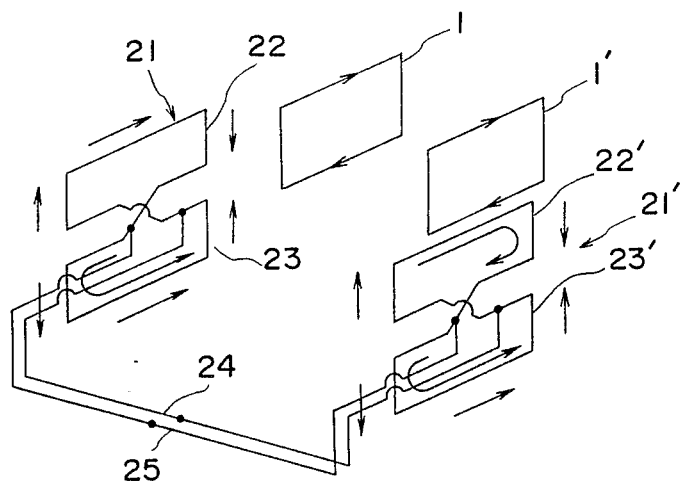
FIG. 11(b) is a circuit diagram for describing the levitating action of the conductor coils shown in FIG. 10.
FIG. 11(c) is a circuit diagram for describing the guiding action of the conductor coils shown in FIG. 10.
Figure 11:
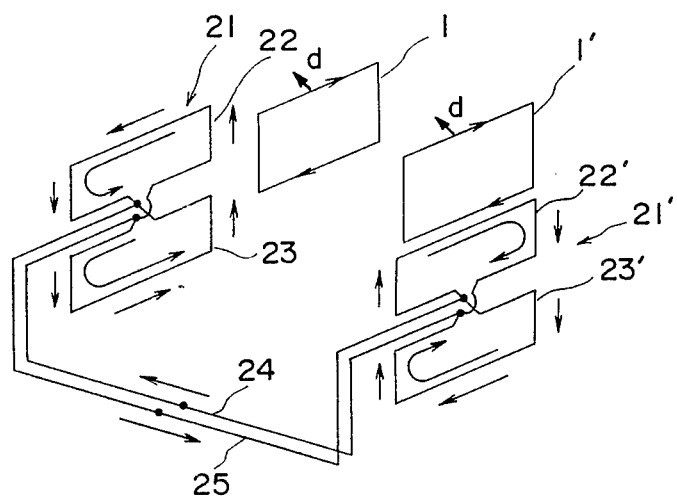

FIGS. 10 through 11(c) illustrate a second embodiment of an inductive repulsion-type magnetically levitated railway according to the present invention. This embodiment differs from the first embodiment mainly in that conductor coils corresponding to the propulsion conductor coils 14, 14' of the first embodiment are not provided, and in that conductor coils having the same construction as the levitation and guidance conductor coils 15, 15' of the first embodiment are made to perform the functions of levitation, propulsion and guidance.

As shown in FIG. 10, conductor coils 21, 21' are disposed in opposed relation on both inner side walls of the U-shaped track bed 9 and are arranged at predetermined intervals continuously along the direction in which the vehicle travels. This structure is similar to that of the levitation and guidance conductor coils 15, 15' in the first embodiment. That is, the conductor coil 21 (21') comprises a null-flux connected upper coil 22 (22') and lower coil 23 (23') having the same shape and dimensions, and the opposing conductor coils 21, 21' on both inner side walls of the U-shaped track bed 9 are null-flux connected. When the vehicle VH is in contact with the ground via its auxiliary wheels 7, 7', the vertical midpoint of the conductor coil 21 and the vertical midpoint of the superconducting coil 1 lie on the same horizontal line, and the upper coil 22 and lower coil 23 are disposed symmetrically about a predetermined point on this horizontal line. The conductor coil 21' also has exactly the same structure and arrangement as the conductor coil 21. In addition, the upper coil 22' corresponds to the upper coil 22, and the lower coil 23' corresponds to the lower coil 23.

A three-phase power supply (or a polyphase power supply of more than three phases) 26 for propulsion is connected to connecting wires 24, 25 which null-flux connect the opposing conductor coils 21, 21'. In a case where a three-phase power supply is used as the propulsion power supply, the arrangement is such that the phases are connected successively to every third conductor coil.

By introducing power from the propulsion power supply 26 to the above-described arrangement, a current for propulsion flows through the conductor coil 21 via a node 27 of connecting line 24 from a to a node 27' through b, c and d, and from e to the node 27' through f, g and h, and a current for propulsion flows through the conductor coil 21' via the node 27 from a' to the node 27' through b', c' and d', and from e' to the node 27' through f', g and h', as shown in FIG. 11(a). Currents having the same direction, which is indicated by the arrows, flow through each of the coils 22, 23, 22', 23'. A propulsion force is produced by the generation of an electromagnetic flux in the forward direction of the vehicle VH between the vertical segments of the conductor coils 21, 21', namely the segments a-b, c-d, e-f, g-h, a'-b', c'-d', e'-f', g'-h', and the vertical segments of the superconducting coils 1, 1'.

Meanwhile, forces for levitation and guidance are generated in the same manner as described above in conjunction with FIGS. 8 and 9. This will be explained again with reference to FIGS. 11(b) and 11(c).

When the vehicle VH is running on its wheels 7, 7', the linkage flux developed by the conductor coils 21, 21' for levitation and guidance is zero, the current is zero and the electromagnetic resistance is zero. The reason for this is that the positional relationship between the superconducting coils 1, 1' and conductor coils 21, 21' is designed as set forth above, while the upper coil 22 and lower coil 23 are null-flux connected, as well as the upper coil 22' and lower coil 23'. When the vehicle VH is running while levitated, the vertical midpoints of the superconducting coils 1, 1' drop below the vertical midpoints of the conductor coils 21, 21', as a result of which a difference is produced in the linkage magnetic flux between upper coil 22 and lower coil 23 and between upper coil 22' and lower coil 23'. Currents as shown in FIG. 11(b) are induced in the upper coils 22, 22' and lower coils 23, 23'. Owing to repulsive and attractive forces between horizontal segments of the coils 22, 23, 22', 23', a levitating force is produced that attempts to return the superconducting coils 1, 1' in the upward direction, with the coils 1, 1' attaining stability at position where the weight of the vehicle VH is counterbalanced, in a manner the same as that set forth above.

The superconducting coils 1, 1' are arranged symmetrically with respect to the longitudinal center line of the track bed 9, and the opposing upper coils 22, 22' and opposing lower coils 23, 23' are null-flux connected via the connecting wires 24, 25. Therefore, when the vehicle VH is situated in the middle of the track bed 9, the linkage flux does not become zero even though there is no lateral displacement of the vehicle VH in the levitated state. However, since the linkage fluxes of the conductor coils 21, 21' are equal, currents do not flow through the connecting wires 24, 25. As a result, no lateral force is produced.

If the vehicle VH shown in FIG. 10 is displaced leftward, for example, during levitated travel, a difference develops in the linkage flux between the superconducting coils 1, 1' and the upper coils 22, 22' and between the superconducting coils 1, 1' and the lower coils 23, 23'. As a result, currents as shown in FIG. 11(c) are induced, whereby a guidance force is produced that the restores the superconducting coils 1, 1' to the middle of the track in the manner described above.

In the embodiments described above, a track bed having a U-shaped cross section is used as the track bed 9. However, it is possible to employ a track bed having a projecting-type cross section. Such an embodiment of the invention will now be described with reference to FIG. 12.

Figure 12:
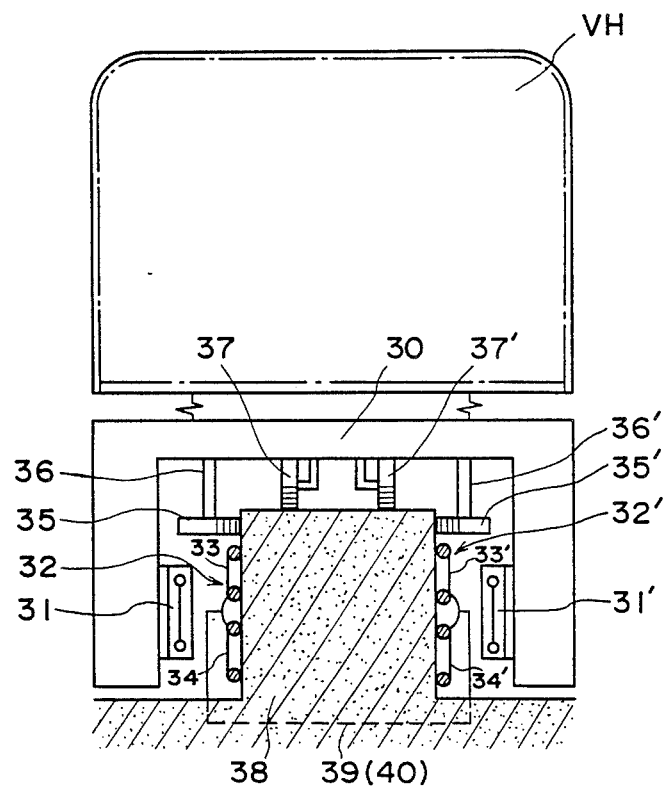
FIG. 12 is a sectional view showing a third embodiment of an inductive repulsion-type magnetically levitated railway according to the present invention.

As shown in FIG. 12, superconducting coils 31, 31' are vertically mounted on both inner side surfaces of a generally box-shaped truck 30 of the vehicle VH, and conductor coils 32, 32' for performing levitation, propulsion and guidance functions, as described above in conjunction with the second embodiment, are arranged on both side walls of a projecting track bed 38 so as to be capable of electromagnetically coupling with the superconducting coils 31, 31'. The conductor coil 32 has upper and lower coils 33, 34, respectively, and the conductor coil 32' has upper and lower coils 33', 34', respectively. The conductor coils 32, 32' are connected by connecting wires 39, 40. Auxiliary wheels 37, 37' are raised when the vehicle VH is running while levitated. When vehicle speed drops below a certain level, the auxiliary wheels 37, 37' are extended from the vehicle VH and make contact with the track bed 38. Mechanical guidance wheels 35, 35' are rotatably mounted on the ends of respective shafts 36, 36' whose other ends are fixedly secured to the vehicle VH. These wheels 35, 35' are deployed and guide the vehicle VH mechanically while rolling along the side walls of the projecting track bed 9 when the vehicle VH is running on its wheels 37, 37'.

The major effects derived from the present invention can be summarized as follows:

(1) In the conventional inductive repulsion-type magnetically levitated railway, the conductor coils 3, 3' for generating the levitating force are disposed horizontally on the bottom of the track bed 9, and the superconducting coils 1, 1 are disposed vertically on both sides of the truck 4, as shown in FIG. 1. This makes it necessary to pass a large induced current through the levitating conductor coils 3, 3', as a result of which a limit is imposed upon the extent to which the power loss of the levitating conductor coils 3, 3' can be reduced. In other words, there is a limit upon the extent to which traveling resistance can be reduced. According to the present invention, however, electromagnetic traveling resistance while the vehicle VH is running on its wheels can be made zero, and this resistance can be minimized even while the vehicle VH is running in a levitated state. This makes it possible to greatly reduce the consumption of energy needed for running the vehicle as compared with the prior art.

(2) A problem that arises in the conventional system is that an unstable spring force in the lateral direction develops from the levitating conductor coils 3, 3'. In accordance with the present invention, however, the superconducting coils 1, 1' are provided so as to oppose the conductor coils 15, 15' for levitation and guidance or the conductor coils 21, 21' for levitation, propulsion and guidance. This eliminates the unstable spring force encountered in the prior art and assures stable levitating and guiding forces.

(3) In accordance with the present invention, it is unnecessary to provide conductor coils on the bottom of the track bed. When the track bed is laid, therefore, it is unnecessary to strictly supervise design precision relating to such work, and a greater degree of freedom of design is provided since limitations regarding the clearance between the truck and the bottom of the track bed.

(4) When the propulsion conductor coils 14, 14' that are required to withstand high voltage are arranged separately and independently of the conductor coils 15, 15' for levitation and guidance and, moreover, the conductor coils 15, 15' are null-flux connected, which is the case shown in FIGS. 6 through 9(c), the null-flux connecting wires 18, 19 need only withstand low voltages and can be laid and maintained with ease.

(5) When the pair of conductor coils 21, 21' provided on both inner side walls of the track bed 9 is made to concurrently perform the functions of levitation, propulsion and guidance, which is the case shown in FIGS. 10 through 11(c), the coil mechanism provided on the track bed 9 assumes its most simple form and costs for installation can be greatly reduced. The conductor coils 21, 21' and their connecting wires 24, 25, though, must be capable of withstanding high voltages. However, the amount of high voltage which must be applied for propulsion is decided by the weight of the moving body, specifically the number of cars making up the train, so that the applied voltage can be reduced correspondingly if the number of cars is reduced. This facilitates design and operations for dealing with high voltage. In this sense, the present invention is well suited as an apparatus for levitating, propelling and guiding a train having a comparatively small number of cars.

In the embodiments described above, a track bed having a U-shaped cross section or a projecting cross section is used as the track beds 9, 38. However, the invention is not limited to these track beds since track beds having various other configurations are possible. Also, it is set forth in the foregoing embodiments that the upper coils 16, 16' (22, 22') and lower coils 17, 17' (23, 23') arranged on the track bed 9 have the same shape and dimensions. However, even if these coils do not have the shape and dimensions [in which case, unlike that of the foregoing embodiments, the linkage flux would not become zero even when the vertical midpoint of the conductor coil 15 (21) and the vertical midpoints of the superconducting coil 1, 1' lie on the same horizontal line], the leakage flux will still become zero and, hence, so will the electromagnetic traveling resistance, if the coils shapes and dimensions are designed in such a manner that the mutual inductance between the superconducting coil 1, 1' and the conductor coils 15, 15' (21, 21') becomes zero when the vehicle is running on its wheels.

Accordingly, the present invention covers cases in which the upper and lower coils of the conductor coils do and do not have the same shape and dimensions.

As many apparently widely different embodiments of the present invention can be made without departing from the spirit and scope thereof, it is to be understood that the invention is not limited to the specific embodiments thereof except as defined in the appended claims.

What we claim is:

1. A levitation, propulsion and guidance mechanism for an inductive repulsion-type magnetically levitated railway having a vehicle with a truck and a track bed along which said truck runs, comprising:
   (a) superconducting coils fixedly arranged vertically on both sides of said truck at predetermined intervals therealong in a direction of travel of said vehicle;
   (b) propulsion coils arranged on opposed walls of said track bed at predetermined intervals therealong in the direction of travel of said vehicle;
   (c) a propulsion power supply connected to said propulsion conductor -coils;
   (d) levitation-guidance conductor coils, each of which includes null-flux connected upper and lower conductor coils arranged on sides of said propulsion conductor coils facing said superconducting coils and positioned to have vertical symmetry, said levitation guidance conductor coils being arranged at said opposed walls of said track at predetermined intervals therealong in the direction of travel of said vehicle; and
   (e) connecting wires for null-flux connecting said levitation-guidance conductor coils to each other.

2. The mechanism according to claim 1, wherein said track bed has a U-shaped cross section and said propulsion conductor coils are arranged on opposed inner walls of said track bed.

3. A levitation, propulsion and guidance mechanism for an inductive repulsion-type magnetically levitated railway having a vehicle with a truck and a track bed along which said truck runs, comprising:
   (a) superconducting coils fixedly arranged vertically on both sides of said truck at predetermined intervals therealong in a direction of travel of said vehicle;
   (b) levitation-propulsion-guidance conductor coils, each of which includes null-flux connected upper and lower conductor coils arranged on respective opposed walls of said track bed and positioned to have vertical symmetry, said levitation-propulsion-guidance conductor coils being arranged at predetermined intervals along said track bed in the direction of travel of said vehicle;
   (c) connecting wires for null-flux connecting said levitation-propulsion-guidance conductor coils to each other; and
   (d) a propulsion power supply connected to said connecting wires.

4. The mechanism according to claim 3, wherein said track bed has a U-shaped cross section and said levitation-propulsion-guidance conductor coils are arranged on opposed inner walls of said track bed.

5. The mechanism according to claim 3, wherein said track bed has a projecting cross section and said levitation-propulsion-guidance conductor coils are arranged on opposed outer walls of said track bed.

* * * * *